(12) United States Patent
Edwards

(10) Patent No.: US 9,776,583 B2
(45) Date of Patent: Oct. 3, 2017

(54) AIRCRAFT ELECTRICAL SYSTEM

(71) Applicant: ROLLS-ROYCE PLC, London (GB)

(72) Inventor: Huw Edwards, Derby (GB)

(73) Assignee: ROLLS-ROYCE plc, London (GB)

( * ) Notice: Subject to any disclaimer, the term of this patent is extended or adjusted under 35 U.S.C. 154(b) by 520 days.

(21) Appl. No.: 14/266,366

(22) Filed: Apr. 30, 2014

(65) Prior Publication Data

US 2014/0333127 A1  Nov. 13, 2014

(30) Foreign Application Priority Data

May 9, 2013 (GB) .................................. 1308292.0

(51) Int. Cl.
| | |
|---|---|
| B60L 1/00 | (2006.01) |
| B60R 16/03 | (2006.01) |
| H02J 4/00 | (2006.01) |
| F02N 11/04 | (2006.01) |

(52) U.S. Cl.
CPC ................ B60R 16/03 (2013.01); H02J 4/00 (2013.01); *B64D 2221/00* (2013.01); *F02N 11/04* (2013.01)

(58) Field of Classification Search
CPC ............. H02J 4/00; B60R 16/03; F02N 11/04
USPC .......................................................... 307/9.1
See application file for complete search history.

(56) References Cited

U.S. PATENT DOCUMENTS

| | | | |
|---|---|---|---|
| 5,587,647 A | 12/1996 | Bansal et al. | |
| 7,538,521 B2 * | 5/2009 | Berenger ................. | H02J 1/10 322/22 |
| 2003/0015873 A1 | 1/2003 | Khalizadeh et al. | |
| 2006/0061213 A1 * | 3/2006 | Michalko ................. | H02J 4/00 307/9.1 |
| 2008/0252267 A1 | 10/2008 | Lando et al. | |

(Continued)

FOREIGN PATENT DOCUMENTS

| | | |
|---|---|---|
| EP | 2 028 104 A2 | 2/2009 |
| EP | 2 040 370 A2 | 3/2009 |

(Continued)

OTHER PUBLICATIONS

European Search Report issued in European Patent Application No. 14 16 6553 dated Jul. 23, 2014.

(Continued)

*Primary Examiner* — Alfonso Perez Borroto
(74) *Attorney, Agent, or Firm* — Oliff PLC

(57) ABSTRACT

An aircraft electrical network including a first starter generator mechanically coupled to a first shaft of an aircraft main engine. The first starter generator is configured to turn the first shaft of the main engine in a starting mode, and to generate electricity from the first shaft of the gas turbine engine in a generating mode. The network further includes a DC electrical bus electrical coupled to one or more electrical loads and an AC electrical bus electrically coupled to the first starter generator. The DC electrical bus is electrically coupled to the AC electrical bus via a bi-directional AC/DC converter, which is configured to provide AC electrical power from the DC electrical bus to power the first starter generator when the first starter generator is in a starting mode, and DC electrical power to the DC electrical bus when the first starter generator is in a generating mode.

15 Claims, 4 Drawing Sheets

(56) References Cited

U.S. PATENT DOCUMENTS

| | | | | |
|---|---|---|---|---|
| 2010/0013419 A1* | 1/2010 | White | ............... | H02P 5/74 318/51 |
| 2010/0039075 A1* | 2/2010 | Trainer | ............... | H02P 9/04 322/58 |
| 2011/0273012 A1* | 11/2011 | Tardy | ............... | H02J 1/102 307/9.1 |
| 2014/0197681 A1* | 7/2014 | Iwashima | ............... | B60R 16/03 307/9.1 |

FOREIGN PATENT DOCUMENTS

| | | |
|---|---|---|
| GB | 2 422 875 A | 8/2006 |
| WO | WO 99/00884 A1 | 1/1999 |

OTHER PUBLICATIONS

Search Report issued in British Application No. GB1308292.0 issued Nov. 7, 2013.

* cited by examiner

AIRCRAFT ELECTRICAL SYSTEM

FIELD OF THE INVENTION

The present invention relates to an aircraft electrical system.

BACKGROUND TO THE INVENTION

Referring to FIG. 1, a conventional aircraft is generally indicated at 2. The aircraft 2 comprises a fuselage 4 and a pair of main engines in the form of main gas turbine engines 10 mounted on wings 6. The aircraft 2 also includes an auxiliary power unit (APU) 8, mounted in the rear of the aircraft fuselage 4.

FIG. 2 shows one of the main gas turbine engines 10 in more detail. Each main engine 10 comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19. The gas turbine 10 further comprises low pressure 38, intermediate pressure 39 and high pressure 40 shafts, which mechanically couple the fan 12, intermediate pressure compressor 13 and high pressure compressor 14 to the low pressure 18, intermediate pressure 17 and high pressure 16 turbines respectively. The APU 8 also conventionally comprises a gas turbine engine, generally comprising a combustor, and a single compressor and turbine, driven by a common shaft.

As well as providing thrust from the propulsive airflows A and B, each engine 10 also provides electrical power for various engine accessories, such as fuel and oil pumps, and for aircraft subsystems such as environmental control, avionics and electrical actuators.

FIG. 3 shows a prior aircraft electrical network 20. The network 20 comprises a plurality of electrical generators 26 which provide alternating current (AC) electrical power to a main AC electrical bus 28. The generators 26 are mechanically driven by a pair of main gas turbine engines 22, an auxiliary power unit (APU) in the form of a further gas turbine engine 24, and a Ram Air Turbine (RAT) 25. Typically, two generators 26 are driven by the same shaft of each main engine 22. The electrical network 20 further comprises a pair of Direct Current (DC) engine electrical buses 30. Each DC engine electrical bus 30 is powered by a one-way AC to DC power converter 32, generally in the form of an auto transformer rectifier, which is in turn powered by the main AC bus 28. Each DC electrical bus 30 powers a plurality of electrical components such as motor controllers 34. The motor controllers 34 are one-way DC to AC converters which in turn power respective AC electrical motors 35 used to drive aircraft electrical loads such as cabin air compressors.

In order to start the main engines 22, one of the generators 26 is operated as a motor by supplying AC electrical power to the generator 26. The AC electrical power is provided by one or more of the motor controllers 34 via an AC interconnector 36, which provides AC power to the starter generator 26 from the motor controller 34. Once the main engines 22 are started, this interconnector 36 is no longer used. In view of the high power requirements of the starter generators 26, and the relatively long cable run of the interconnector 36 between the motor controller 34 and main engines 22, the interconnector 36 is relatively heavy, weighing approximately 40 kg in the case of the interconnector on typical wide body aircraft. It is therefore desirable to provide AC electrical power to the starter generators 26 without the requirement for a heavy AC interconnector connecting the motor controllers 34 and main engine starter generators 26. This method of providing electrical power to the main engines 26 also does not provide any redundancy, since if the interconnector 36 is not available, no power can be transferred to the starter generators 26.

In a separate problem, in the case of civil aircraft, it is generally necessary to be able to recover from a mid-air main engine shutdown by restarting the main engine 22. This may be done using the main engine starter generator 26, powered either by the APU or the other main engine's power offtake, by "windmilling" the shutdown main engine, i.e. by allowing air flow through the engine caused by the forward speed of the aircraft to turn the engine, or by a combination of these methods. In any case, it is necessary for the high pressure compressor 14 and turbine 16 to operate during mid-air restarts in order to provide sufficient pressure in the combustor 15 to support combustion. Where the main engine starter generator 26 is powered by the APU 8, there is necessarily a delay while the APU 8 is started, which may be unacceptable.

Furthermore, where the high pressure shaft 40 is used to operate an electrical generator, a large electrical offtake from the high pressure shaft 40 can impact on engine operability during off-design periods (such as at flight idle). During these periods, it may be necessary to open bleed valves (not shown) in order to prevent stall or surge of the compressor 14, which results in low fuel efficiency (i.e. higher fuel burn).

The present invention describes an aircraft electrical system which seeks to overcome some or all of the above problems.

SUMMARY OF THE INVENTION

According to a first aspect of the present invention, there is provided an aircraft electrical network comprising:

a first starter generator mechanically coupled to a first shaft of an aircraft main engine, the first starter generator being configured to turn the first shaft of the main engine when operated in a starting mode, and to generate electricity from the first shaft of the gas turbine engine when operated in a generating mode;

a DC electrical bus electrical coupled to one or more electrical loads; and an AC electrical bus electrically coupled to the first starter generator; wherein the DC electrical bus is electrically coupled to the AC electrical bus via a bi-directional AC/DC converter, and wherein;

the bi-directional AC/DC converter is configured to provide AC electrical power from the DC electrical bus to power the first starter generator when the first starter generator is in a starting mode, and DC electrical power to the DC electrical bus when the first starter generator is in a generating mode.

Advantageously, the invention provides an aircraft electrical network in which the first starter generator can be operated in the starting mode by AC electrical power provided by the DC electrical bus, which may be provided by the APU or a further main engine of the aircraft for example, via a bi-directional AC/DC converter. Consequently, there is no requirement for an additional AC interconnector between the motor controllers and the starter generator, thereby reducing weight, since the power for starting the starter generator can be delivered through the existing electrical network.

The electrical network may comprise a plurality of main engines, each being electrically coupled to a respective DC electrical bus, AC electrical bus and bi-directional AC/DC converter.

The electrical network may comprise an engine AC electrical bus comprising one or more engine electrical loads, and an aircraft AC electrical bus comprising one or more aircraft electrical loads. The electrical network may comprise an AC interconnector connecting the aircraft AC electrical bus to the engine AC electrical bus.

The electrical network may further comprise an energy storage device electrically coupled to the DC electrical bus. The energy storage device may comprise a chemical battery. The energy storage device may be configured to provide power to the DC bus when the first starter generator is in the starting mode, and may be configured to receive power from the DC bus when the first starter generator is in the generating mode. Advantageously, DC power produced by the energy storage device can be used to both power the DC loads on the DC bus, and provide power to the starter generator when the starter generator is in the starting mode, again without requiring an additional interconnector.

The main engine may comprise a gas turbine engine which may comprise a high pressure shaft and one or more further shafts. The first starter generator may be mechanically coupled to the high pressure shaft. The aircraft electrical network may comprise a further electrical generator mechanically coupled to the further shaft. The first starter generator may be electrically coupled to the aircraft AC electrical bus, and the further starter generator may be electrically coupled to the engine AC electrical bus. Advantageously, the electrical network may provide improved mid-air restarting capability, by driving the electrical loads, and in particular, engine electrical loads such as the fuel pump, from a shaft other than the HP shaft.

The further electrical generator may be electrically coupled to a further AC to DC converter to provide DC electrical power to the DC electrical bus. The further AC to DC converter may comprise a one way AC to DC converter such as a diode rectifier. Advantageously, the DC electrical bus may be provided with electrical power from two independent generators, operating on separate shafts, from two independent generators via two independent AC to DC converters. Since the further AC to DC converter need only convert AC power to DC power, and not also DC power to AC power, the further AC to DC converter can be made simpler and more robust. As a further advantage therefore, where the further AC to DC converter is used to supply electrical power to the DC electrical bus in normal use, the more complex and expensive bidirectional AC/DC converter would be subject to reduced loads, or may be used less often, therefore increasing its life.

The further electrical generator may be electrically coupled to the AC/DC bidirectional converter via the AC interconnector to provide AC electrical power to the AC/DC bidirectional converter. Advantageously, the further generator provides redundancy for providing both DC power to the DC engine electrical bus, and AC power to the starter generator via the AC/DC bidirectional converter.

The DC electrical bus may provide DC electrical power to one or more AC motor controllers which motor controllers are configured to provide AC electrical power to a respective AC motor. The AC/DC bidirectional converter may be electrically coupled to one or more AC motors to provide AC electrical power to the one or more coupled AC motors. The bidirectional AC/DC converter may comprise one or more of a gate driver, a low voltage power source, and a motor speed input signal controller. Advantageously, the bidirectional converter can additionally provide backup power to the one or more AC motors should the respective AC motor controller fail.

The electrical network may comprise a network controller configured to operate the aircraft electrical network. The network controller may be configured to moderate the electrical power provided to the electrical loads from each of the first starter generator and the further electrical generator, and to moderate the power provided to at least the first starter generator from the DC electrical bus.

The network controller may be configured to operate the electrical network in a first generating mode, in which the further electrical generator provides substantially all electrical power to the main engine electrical loads and the first starter generator provides substantially all electrical power to the aircraft electrical loads. The network controller may be configured to operate the electrical network in a second generating mode, in which the further generator provides at least part of the electrical power to both the aircraft and engine electrical loads and the starter generator provides the balance of electrical power to the aircraft electrical loads. The controller may be configured to switch between the first and second generating modes on the basis of a determination that operation in a respective mode will result in a reduced fuel flow compared to operation in the other mode.

Advantageously, the starter generator and further generator can be used in conjunction, with the further generator providing some or all of a power requirement of the aircraft electrical loads when this is determined to result in a reduced fuel flow, thereby resulting in more efficient operation of the electrical network.

The determination that operation in a respective mode will result in a reduced fuel flow may be made on the basis of one or more of a predetermined engine shaft rotation speed, spare electrical generating capacity in the further electrical generator and an engine shutdown condition.

The controller may be configured to operate the electrical network in a starting mode, in which the main engine is in a shutdown condition, wherein the aircraft and engine electrical loads are provided by the further generator and/or an auxiliary power source.

The auxiliary power source may comprise a further main engine, or may comprise an auxiliary gas turbine engine, or may comprise the energy storage device. The controller may be configured such that, in the starting mode, the engine AC electrical bus is powered by the further electrical generator or by power from the aircraft AC electrical bus.

Advantageously, power can be provided to the engine and aircraft loads and the first starter generator, while not imposing any loads on the first starter generator. This enables inflight restart, since the braking forces the offtake loads would otherwise impart on the high pressure shaft are reduced or eliminated. Meanwhile, the engine electrical loads (in particular, the fuel and oil pumps) can be powered by the further electrical generator, since the further electrical generator is powered by the further shaft, which is more capable of absorbing braking forces without inhibiting inflight restarts.

The further generator may comprise a starter generator configured to turn the further shaft of the gas turbine engine when operated in a starting mode, and to generate electricity from the further shaft of the gas turbine engine when operated in a generating mode. The controller may be configured such that, when the electrical network is in the starting mode, the further starter generator is first operated in the starting mode to turn the further shaft, and the first starter generator is then operated in the starting mode to turn the first shaft. By sequentially turning the further starter generator followed by the first starter generator, the torque required for each starter generator to start the engine can be substantially reduced, thereby reducing the required power rating of the bidirectional converter. This starting method may also reduce start times.

DETAILED DESCRIPTION

Figure 1:
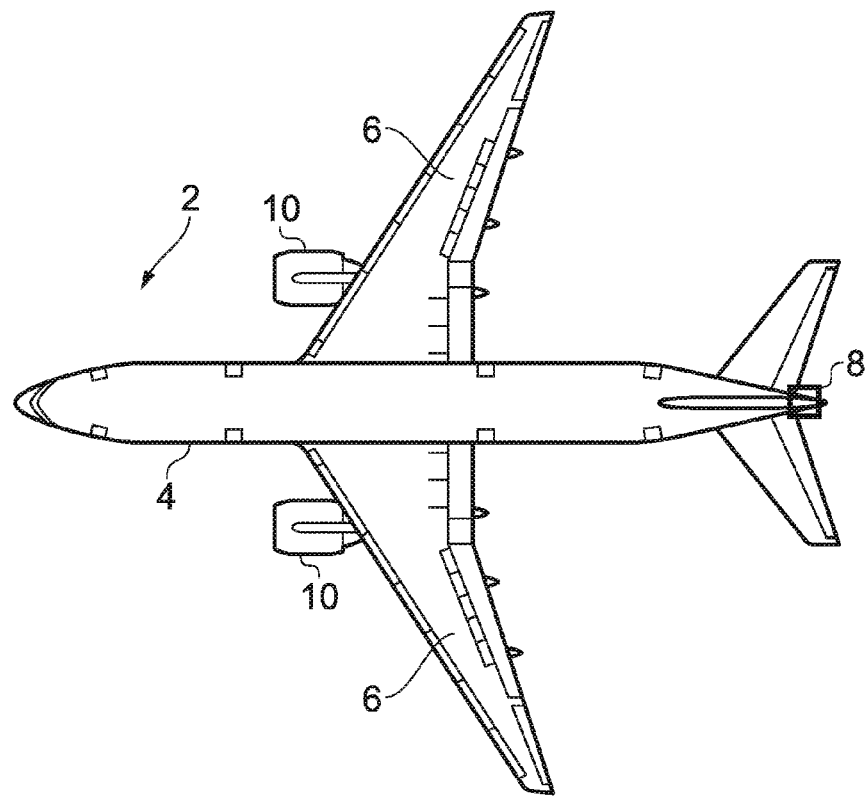
FIG. 1 shows an aircraft.
Figure 2:
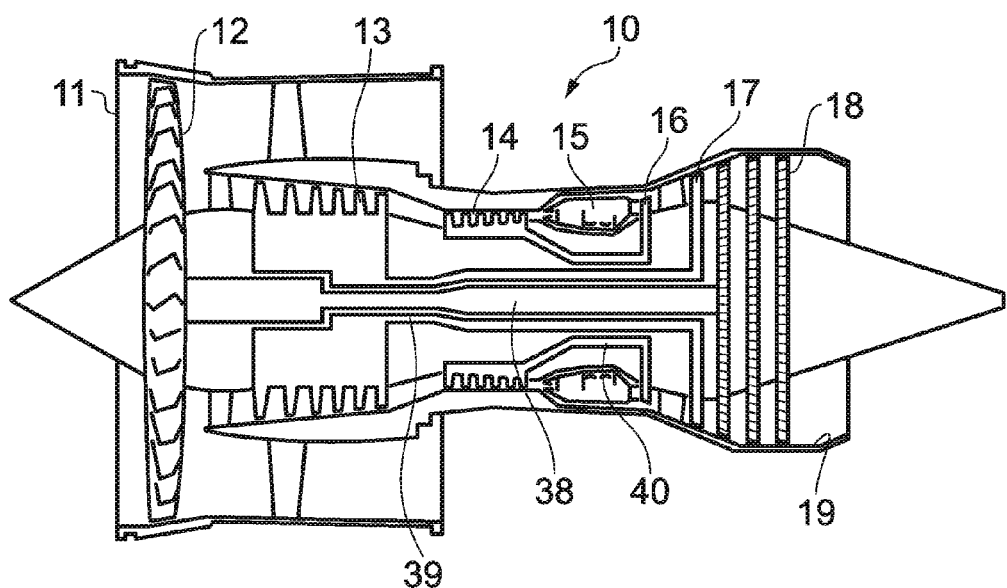
FIG. 2 shows a gas turbine engine.
Figure 3:
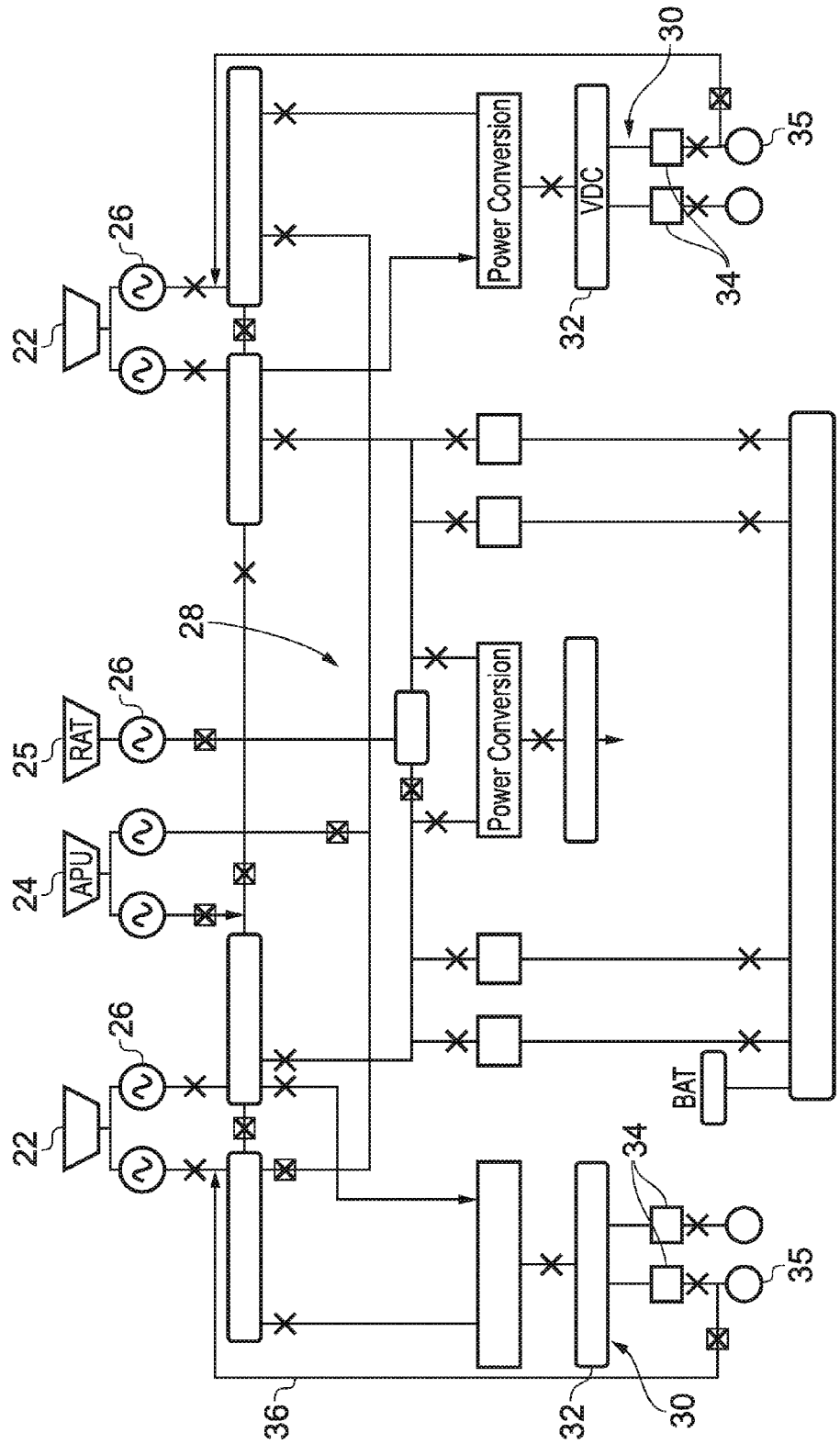
FIG. 3 shows a prior engine electrical network topology.
Figure 4:
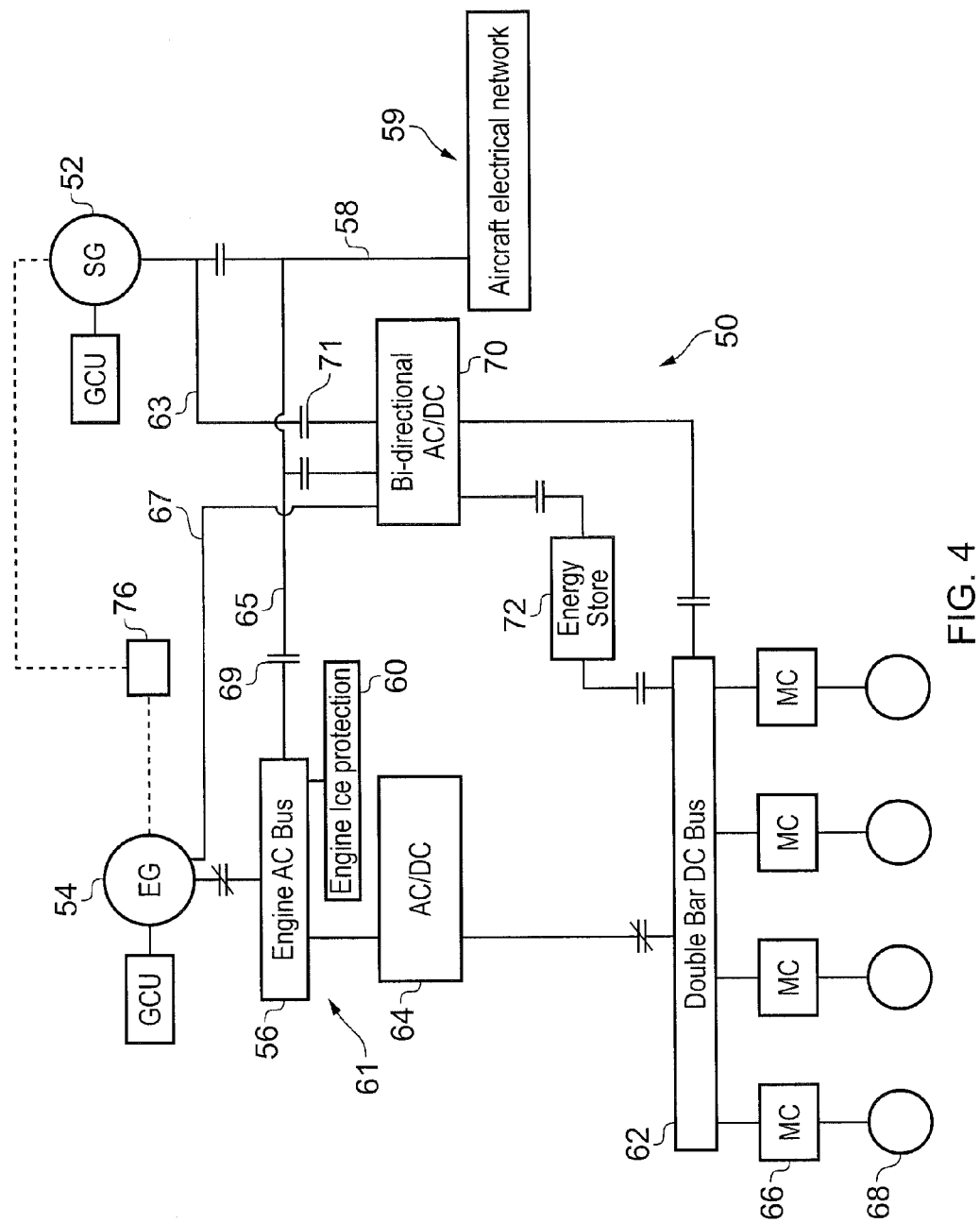
FIG. 4 shows a first engine network topology in accordance with the present invention.

FIG. 4 shows an engine electrical network 50. The electrical network 50 comprises a first starter generator 52, and a further starter generator 54. Both starter generators 52 and 54 comprise multi-phase (preferably between 4 and 9 phases) AC electrical machines configured to provide AC electrical power when turned (i.e. when in a generating mode), and to provide motive power when provided with AC electrical power (i.e. when in a starting mode). The generators 52, 54 could for example comprise permanent magnet AC electrical generators, or wound field machines, or switched reluctance machines, or machines having a controllable AC field, such as doubly fed induction machines. The engine electrical network is part of an aircraft 2 (shown in FIG. 1), which comprises a fuselage 4 and a pair of wings 6. The aircraft includes a pair of wing mounted main engines 10, and an APU 8 mounted at the rear of the aircraft 2, within the empennage. An engine electrical network 50 is provided for each main engine 10.

The first starter generator 52 is mechanically coupled to the high pressure shaft 40 of one of the main gas turbine engines 10, while the further starter generator 54 is mechanically coupled to one of the low pressure shaft and intermediate pressure shafts 38, 39 of the main gas turbine engine 10. Typically, there are two starter generators 52, 54 provided for each shaft 38, 39. The starter generators 52, 54 are configured to generate AC electrical power when in a generating mode (i.e. when turned by the corresponding shaft 38, 39, 40 of the main gas turbine engine 10), and to turn the corresponding shaft 38, 39, 40 to start the main engine 10 when in a starting mode (i.e. when supplied with AC electrical power to be thereby operated as an AC electrical motor). In the described embodiment, the generators 52, 54 provide AC power having voltages of either 115 or 230 Volts Root Mean Squared (RMS). The frequency of the generated power will depend on the rotational speed of the respective engine shaft 38, 39, 40.

The generators 52, 54 provide AC electrical power to an engine AC electrical bus 56 and an aircraft AC electrical bus 58. The aircraft AC electrical bus 59 forms part of a wider aircraft electrical network 59, and provides AC electrical power to aircraft electrical systems such as avionics, and the aircraft environmental control system. The engine AC electrical bus 56 forms part of an engine electrical network 61, and provides AC electrical power to engine AC electrical systems such as engine ice protection systems 60, as well as a DC electrical bus 62 via a uni-directional AC to DC converter in the form of a diode rectifier 64, which converts the AC electrical power supplied by the engine AC bus 56 to DC electrical power. A first AC interconnector 65 electrically couples the engine and aircraft AC electrical buses 56, 58. The interconnector 65 comprises a contactor 69. In normal operation, the contactor 69 is in an open position, such that the engine and aircraft electrical buses 56, 58 are electrically isolated from one another.

The engine DC electrical bus 62 typically supplies voltages of between +/−270V and +/540 V, and comprises a plurality of loads including motor controllers 66. The motor controller 66 draws DC power from the DC bus 62, and converts this to AC electrical power to respective AC motors 68. In the described embodiment, the total DC electrical load is approximately 150 kW. Of these loads, the largest load in most circumstances will generally be the engine fuel pump motor, which may have a maximum load of in excess of 100 kW.

The electrical network 50 further comprises a bidirectional AC/DC converter 70 electrically coupled to the engine DC electrical bus 62 and the first starter generator 52 via a first start bypass cable 63, and to the further starter generator 54 via a second bypass cable 67. The first bypass cable 63 comprises a contactor 71, which is open in normal use. The bi-directional AC/DC converter 70 is configured to provide DC electrical power to the engine DC electrical bus 62 from the first starter generator 52 when the first starter generator 52 is in the generating mode, and to provide AC electrical power to at least the first starter generator 52 from the DC electrical bus 62 via the first bypass cable 63 (and in this embodiment, also to the further starter generator 54 via the second bypass cable 67) to start the main engine 10 when the starter generator 52 is in the starting mode.

The electrical network 50 further comprises an energy storage device in the form of a chemical battery 72. The battery 72 is electrically coupled to the DC side of the bi-directional AC/DC converter 70 and the engine DC electrical bus 62. In normal operation, the bi-directional converter 70 provides DC electrical power to the battery 72 to charge the battery 72. The battery 72 may then be used to provide DC electrical power to the bi-directional AC/DC converter 70 during certain conditions, such as during engine acceleration. By using the battery 72 to provide electrical power to the electrical loads 68 during acceleration, the load on the first starter generator 52, and therefore on the high pressure shaft 40, can by briefly reduced. Power could also be supplied by the battery 72 to the electrical loads to enable a lower idle.

The electrical network 50 further comprises a network controller 76. The controller is configured to control the operation of the electrical network, and in particular, to start the engines 10, and to moderate the amount of electrical power provided by the further starter generator 54, and the first starter generator 52 to the various electrical loads of the engine and aircraft buses 61, 59. The controller 76 may comprise an engine FADEC controller 76. The electrical network 50 is operated by the controller 76 as follows.

In a ground starting mode, the controller 76 is used to start the main engines 10 in the case of a ground start using the starter generators 52, 54 as follows. The further starter generator 54 is operated in the starting mode, in which the further starter generator 54 is first cranked to rotate the intermediate pressure compressor 13 to thereby build up pressure at the intake of the high pressure compressor 14. Once the intermediate pressure compressor 13 is rotating at a sufficient predetermined condition (for example speed), the starter power is transferred from the further starter generator 54 to the high pressure shaft 40 connected first starter generator 52 to operate the first starter generator 52 in the starting mode. The first starter generator 52 continues to be turned until the engine 10 is fully started. This starting method is particularly beneficial if the further starter generator 54 is connected to the intermediate pressure shaft 39, but could also be of benefit if connect to the low pressure shaft 38 in a three shaft engine, or a low pressure booster stage in a two shaft gas turbine engine. Advantageously, this starting method results in a reduced starting torque requirement on the starter generator 52 compared to other starting methods, thereby reducing the required rating of the generators 52, 54. As a further benefit, starting time is reduced. Alternatively, the main engines 10 could be started by turning either of the generators 52, 54 alone, depending on the capabilities of the respective starter generators 52, 54 and the sizes of the respective compressors 13, 14.

Power for each of the starter generators 52, 54 during ground start mode is typically provided by the APU (not shown) or a ground cart and fed to the engine network AC bus 56 from the aircraft network AC bus 59 via interconnector 65. The AC power is then routed to the DC bus 62 from engine AC bus 56 via AC to DC converter 64. DC power is then routed through the bi-directional converter 70 and converted to AC power. The AC power from the bidirectional AC/DC converter 70 is then routed to the first starter generator 52 through bypass cable 63. Consequently, AC power can be simultaneously received from the aircraft AC bus 59 for starting of the further starter generator 54 via engine bus 56 and interconnector 65, and sent from the bi-directional converter 70 to the first starter generator 52. The contactors 69 and 71 would be closed during starting to ensure power is sent in the correct cables, controlled possibly by the controller 76 or another control system.

Once started, the electrical network 50 is normally operated in flight by the controller 76 in a first generating mode. In the first generating mode, the first starter generator 52 provides substantially all of the electrical power for the aircraft main AC bus 59, while the further generator 54 provides substantially all of the electrical power for the engine AC bus 56. However, the engine 10 is operated in a second mode where it is determined that a fuel saving (i.e. a reduced fuel flow) can be made. In the second mode, further starter generator 54 provides electrical power to both the aircraft and engine main AC buses 59, 56, and the first starter generator 52 provides the balance of electrical power to the aircraft main AC bus 59 via the interconnector 65. In this way, the engine generator 52 can be used to assist the first starter generator 52 when excess power is available, and it is determined that there is a fuel burn saving to do so.

The fuel saving may arise where the engine 10 is operated under particular conditions, such as at low thrust (i.e. where the engine shafts 38, 39, 40 are operated at relatively low speeds). Under these conditions, the relatively high load imposed on the first starter generator 52 by the aircraft AC bus 59 electrical loads may result in a relatively large amount of mechanical power being extracted from the high pressure shaft 40 by the first starter generator 52. Consequently, in order to maintain the high pressure compressor 14 within required operational limits (e.g. stall or surge margin), handling bleeds must be opened, resulting in relatively inefficient operation of the engine 10. At the same time, since the majority of the electrical load on the engine AC electrical bus 56 comprises the load from the fuel pump, the load on the second starter generator 54 will be relatively small at low thrust levels, due to the relatively low fuel flow. Consequently, at low thrust levels the second starter generator 54 will generally have excess generating capacity, while the first starter generator 52 will be heavily loaded. The electrical network 50 is therefore operated in the second mode where the engine 10 is at low thrust levels, i.e. where one or more of the shafts 38, 39, 40 is operated at relatively low speeds.

Alternatively or in addition, the electrical network 50 may be operated in the second mode where the further starter generator 54 is determined to be producing excess power. The excess power produced by further starter generator 54 could be measured using voltage and current measurements, and the known capacity of the generator 54 for example. This capacity could include transient capability of the generator 54 (typically 125% for 5 minutes).

This transfer of power must be controlled by the electrical network 50, ensuring that the electrical loads are unaffected by the transfer (such as by frequency droop, voltage droop or frequency matching control). A master and slave approach could be used with the bidirectional converter 70 and either the first starter generator 52 generator control unit (GCU) or if the aircraft network is DC, the aircraft AC to DC converter. This would most likely lead to one being a current source and the other a voltage source. This enables power delivery to be transferred in a controlled manner from one source to the other.

The controller 76 could assess whether there is a fuel saving based on data from a real time model running in the FADEC or flightdeck or known operating conditions based on test data (e.g. from a look up table), or simply based on engine speed and a predetermined activation speed. Embedded algorithms within the controller 76 could be used to optimise this decision making for fuel burn, life and maintenance burden. In one embodiment, it could be desirable not to switch between the first and second operating modes too frequently, in order to reduce thermal cycling of components, e.g. there could be a minimum time between switching events. Alternatively or in addition, there could be a minimum allowed amount of power transfer (i.e it would not be worth transferring 1 watt, if that was the only available power)—this would be to minimise excessive oscillation for a power transfer when the benefits are minimal. This would yield increased life.

In addition, if power transfer is no longer available (for example where no or very little excess power is available from the further generator 54 for the given operating condition, or where a fault is detected) then the controller 76 would switch the electrical network 50 back to the first operating mode. In addition, if there is a problem with one of the first starter generators 52, the further starter generators 54 could be used to provide some or all of the power to the electrical loads 68, depending on its free capacity. This could again include its transient capability (typically 125% for 5 minutes).

The further starter generator 54 will typically operate at a different frequency to the first starter generators 52, due to the different speed ranges of the shafts 38, 39, 40. For this reason, the excess power sent from the further starter generator 54 to the aircraft electrical loads must be either converted to DC by converter 64, and sent to the aircraft DC bus 62, or converted to AC power of appropriate frequency for the aircraft AC bus 59 (typically in the range 360-800 Hz). Any power sent to the aircraft AC bus 59 would need to meet power quality requirements, such as DO160, the latest version. This may require the power to be conditioned by a power electronics unit, using sufficient filtering or device control. To assist with this power quality, the frequency of the power developed by the further starter generator 54 could be higher than the frequency of the aircraft AC electrical bus 59. This could be in the region of 1000-2000 Hz. Alternatively or in addition, the starter generators could comprise multi-phase generators, e.g. 4-9 phases. With more pulses and higher frequency, the size of the passive components in the filters could be lower.

The controller 76 communicates with the FADEC, generator controllers and the bi-directional AC/Dc converter 70 used to provide power to the aircraft. It also controls the contactors 69, 71, which could be solid state power controls or conventional mechanical contactors (amongst others). It will also need to communicate with the engine aircraft generator GCU's, to initiate the power transfer.

The electrical network 50 can also be operated in an inflight starting mode following a mid-air shutdown of the main engine 10. In the inflight starting mode, the engine 10 may be started by windmilling the compressors 13, 14. Alternatively, first starter generator 52 can be operated in the starting mode to turn the high pressure shaft 40, thereby starting the engine 10. In this case, the AC electrical power for the starter generator 52 is provided by the chemical battery 72 via the bi-directional AC/DC converter 70, or from the aircraft AC electrical bus 59 or from the APU.

Figure 5:
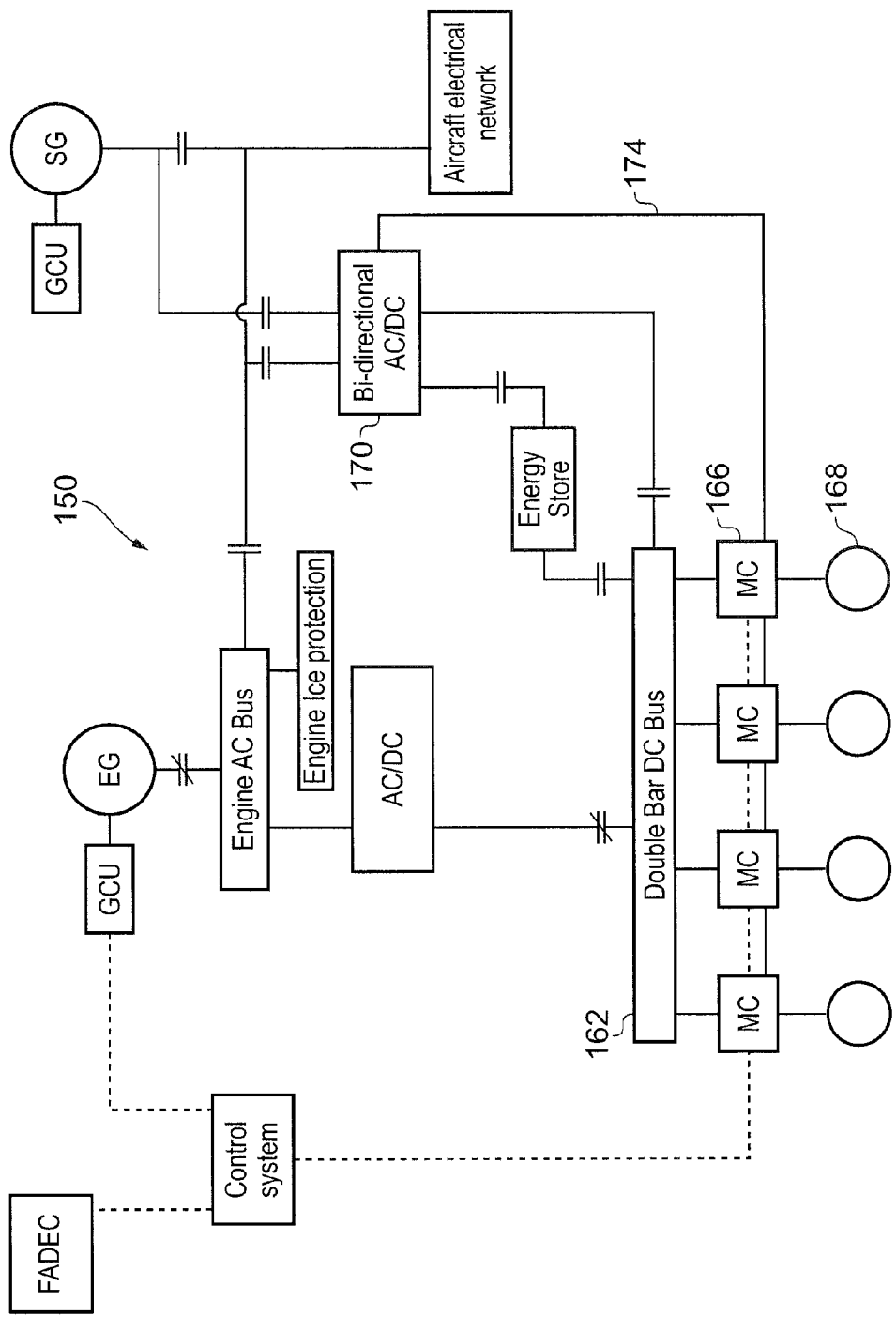
FIG. 5 shows a second network topology in accordance with the present invention.

Advantageously power can be provided from the aircraft AC electrical bus 59 to the engine loads such as the fuel pump via interconnector 65, and engine AC electrical bus 56, AC to DC converter 64 and DC bus 62. DC bus 62 can then also provide DC power to the bidirectional converter 70, and use the bypass cable 63 to provide start power to the first starter generator 52. This enables easier inflight restart, where the braking force that would normally be imposed on the shafts 39, 40 by the electrical loads on the generators 52, 54 are removed from both shafts 39, 40, since the electrical power for the engine electrical loads is routed from the other engine 10 or from the APU. FIG. 5 shows a second electrical network 150. The network 150 is similar to the network 50, but further includes a second interconnector 174 between the AC side of the bi-directional AC/DC converter 170 and the AC electrical motors 168. The bi-directional converter 170 is capable of operating as a motor controller, such that the bi-directional converter 170 can provide AC electrical power to any of the motors 168 should one of the AC motor controllers 166 fail. This system thereby provides improved redundancy compared to the electrical network 50, without the requirement for further components.

In this embodiment, the stators of the electric motors have electrical redundancy to provide single electrical fault tolerance. This redundancy could include double 3 phase electrical machines where some level of electrical, magnetic and thermal isolation of stator coils is achieved, ensuring one winding fault in one of the 3 phase sets does not cascade a failure to the other 3 phase set (as is known in the art). In this way, part of the machine's capability is retained on failure of one of the phase sets. This is a similar concept to fault tolerant machine, where each phase is independent. The advantage with a double 3 phase machine such as this is that it can use a normal 6 switch motor controller 166, and rely on the bidirectional converter 70 as a redundant motor controller. Conventionally, a fault tolerant system would typically not have a spare motor controller but rely on more complex independent phase control to give single electrical fault tolerance. Independent phase control typically requires 4 switches per phase, which can lead to complex motor controllers. Consequently, the motor controllers 166 can be of simpler design compared to prior motor controllers in aircraft electrical systems, while still providing fault tolerance.

Alternatively, or in addition, fault tolerance in the stator could be achieved by providing an axially split stator. Electrical machines comprising axially split stators typically comprise a single rotor, and two stators independent of each other, wherein the coils are separated axially (and is known in the art).

In some cases, the DC bus 162 may also comprise further features to provide fault tolerance. For example, the DC bus 162 could comprise a double bar DC bus having a main bus and a reserve bus, in the form of a DC ring main, where one electrical fault can be managed and isolated without preventing power getting from the power sources to the DC electrical loads 168.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

Components of the electrical system on the main engine 10, either on the engine core, or within the nacelle. For example, the starter generators 52, 54 could be mounted on the engine core, and the power electronics (i.e. the converters 64, 70 and motor controllers 66) could be mounted on the nacelle. This arrangement could be particularly advantageous, since power electronics are typically more sensitive to high temperatures, as would be experienced by components mounted on the core. On the other hand, this could be partially offset with improved high temperature materials such as silicon carbide.

If core mounted, it would be advantageous to mount the components in the lower half of the engine 10 to avoid the heat soak effect after engine shut down. Mounting the systems nearest the coolest compressors (i.e. the intermediate pressure compressor 13, on the side nearest the fan 12) would be advantageous. Heat shields and/or a separate bypass air cooled compartment could be used. The electrical may be thermally isolated from the ambient environment and rely of fluid cooling.

The power electronics and motors could be conduction cooled via fuel or oil pipes in thermal contact with their stators. This cooling arrangement could be integrated into the devices or advantageously arranged so that the electric motor or power electronics can be removed without breaking a fuel or oil line. This would allow maintenance of the device without the added problem of breaking fuel lines, which tends to mean ground runs are required to check for leaks, adding to the maintenance burden. Alternatively if seeking to preclude the use of rotating seals, a "flooded motor" could be used, having an integrated pump heat.

Where the generators are core mounted, the engine 10 may not require a shaft offtake transmission. This could be appropriate where the starter generators 52, 54 are embedded in the engine, such as in the tail cone or in the front bearing housing (with sufficient cooling air and oil flow, and insulation from hot zones).

The invention claimed is:

1. An aircraft comprising a main engine, a network controller, and an electrical network, the electrical network comprising:
    a first starter generator mechanically coupled to a first shaft of the main engine, the first starter generator being configured to turn the first shaft of the main engine when operated in a starting mode, and to generate electricity from the first shaft of the main engine when operated in a generating mode, the generating mode including a normal generating mode and a fuel saving generating mode;

a further electrical generator mechanically coupled to a further shaft of the main engine;

a DC electrical bus electrically coupled to one or more electrical loads; and an engine AC electrical bus comprising one or more engine electrical loads and an aircraft AC electrical bus comprising one or more aircraft electrical loads, each of the engine AC electrical bus and the aircraft AC electrical bus being electrically coupled to the first starter generator and the further electrical generator;

wherein:

the DC electrical bus is electrically coupled to one of the AC electrical buses via a bi-directional AC/DC converter;

the bi-directional AC/DC converter is configured to provide AC electrical power from the DC electrical bus to power the first starter generator when the first starter generator is in the starting mode, and DC electrical power to the DC electrical bus when the first starter generator is in the generating mode; and the network controller is configured to control electrical power provided to the engine electrical loads and the aircraft electrical loads from each of the first starter generator and the further electrical generator, and to control the power provided to at least the first starter generator from the DC electrical bus, the network controller being further configured to operate the electrical network in the normal generating mode in which the further electrical generator provides all AC electrical power for the engine electrical loads and the first starter generator provides all AC electrical power for the aircraft electrical loads, and the fuel-saving generating mode in which the further electrical generator provides at least part of the electrical power for each of the aircraft electrical loads and engine electrical loads and the first starter generator provides the balance of electrical power for the aircraft electrical loads.

2. The aircraft according to claim 1, wherein the electrical network comprises a plurality of main engines, each being electrically coupled to a respective DC electrical bus, engine AC electrical bus, aircraft AC electrical bus, and bi-directional AC/DC converter.

3. The aircraft according to claim 1, wherein the electrical network comprised an AC interconnector connecting the aircraft AC electrical bus to the engine AC electrical bus.

4. The aircraft according to claim 1, wherein the electrical network comprises an energy storage device electrically coupled to the DC electrical bus.

5. The aircraft according to claim 1, wherein the main engine comprises a gas turbine engine having a high pressure shaft and one or more further shafts.

6. The aircraft according to claim 5, wherein the first starter generator is mechanically coupled to the high pressure shaft.

7. The aircraft according to claim 1, wherein the further electrical generator is electrically coupled to a further AC to DC converter to provide DC electrical power to the DC electrical bus.

8. The aircraft according to claim 3, wherein the further electrical generator is electrically coupled to the bi-directional AC/DC converter via the AC interconnector to provide AC electrical power to the bi-directional AC/DC converter.

9. The aircraft according to claim 1, wherein the DC electrical bus provides DC electrical power to one or more AC motor controllers, which motor controllers are configured to provide AC electrical power to a respective AC motor.

10. The aircraft according to claim 9, wherein the bi-directional AC/DC converter is electrically coupled to one or more AC motors to provide AC electrical power to the one or more coupled AC motors.

11. The aircraft according to claim 1, wherein the controller is configured to switch between the normal and fuel-saving generating modes on the basis of a determination that operation in a respective mode will result in a reduced fuel flow compared to operation in the other mode.

12. The aircraft according to claim 11, wherein the determination that operation in the respective mode will result in the reduced fuel flow is made on the basis of one or more of a predetermined engine shaft rotation speed, spare electrical generating capacity in the further electrical generator and an engine shutdown condition.

13. The aircraft according to claim 1, wherein the controller is configured to operate the electrical network in the starting mode, wherein the aircraft and engine electrical loads are provided by the further generator and/or an auxiliary power source.

14. The aircraft according to claim 1, wherein the further generator comprises a starter generator configured to turn the further shaft of the main engine when operated in the starting mode, and to generate electricity from the further shaft of the main engine when operated in the generating mode.

15. The aircraft according to claim 14, wherein the controller is configured such that, when the electrical network is in the starting mode, the further starter generator is first operated in the starting mode to turn the further shaft, and the first starter generator is then operated in the starting mode to turn the first shaft.

* * * * *